June 12, 1951     E. M. JÄRVINEN     2,556,585
INTERNAL-COMBUSTION MOTOR WITH CYLINDERS ARRANGED CONCENTRICALLY
ABOUT AND PARALLEL WITH THE DRIVESHAFT
Filed Nov. 15, 1946
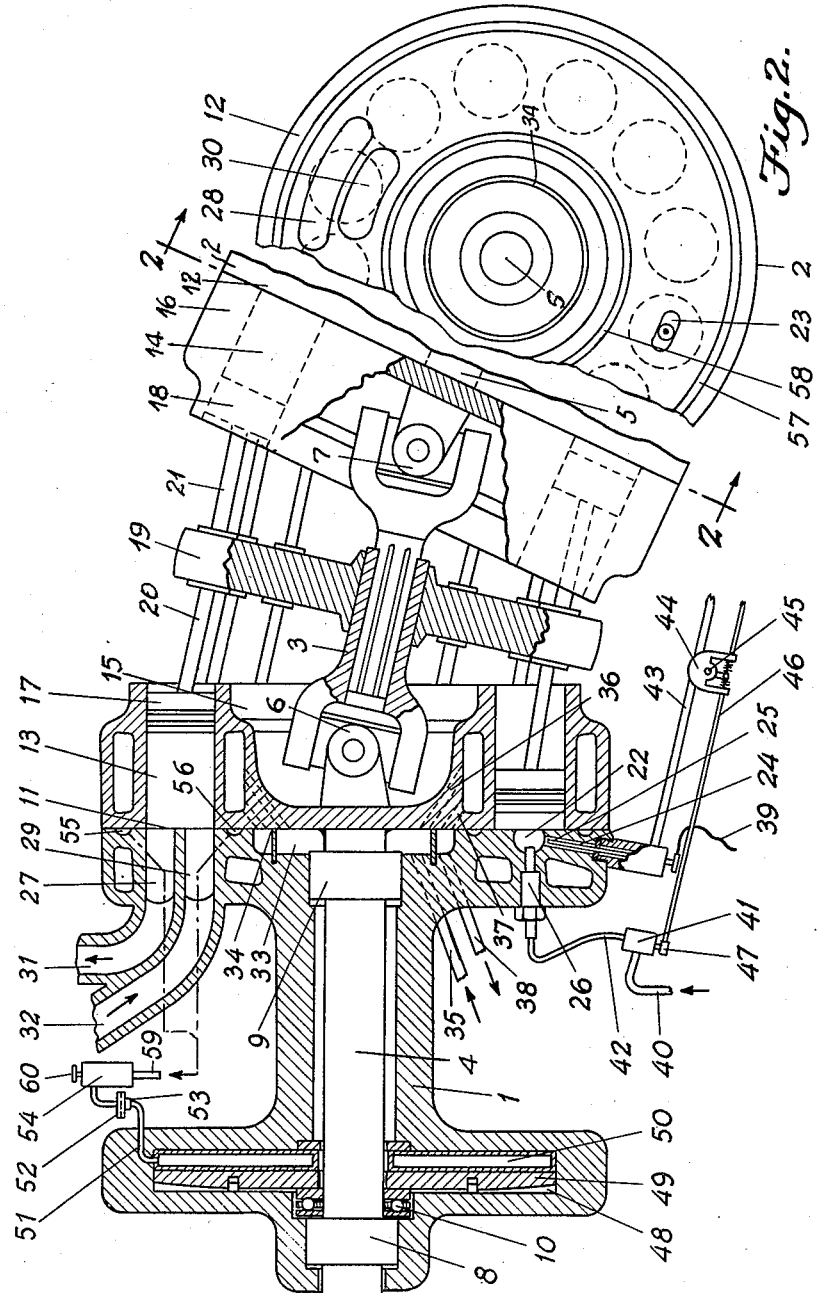
INVENTOR.
Eero Matias Järvinen
BY
Albert M. Parker
ATTORNEY Patented June 12, 1951

2,556,585

UNITED STATES PATENT OFFICE 2,556,585

INTERNAL-COMBUSTION MOTOR WITH CYLINDERS ARRANGED CONCENTRICALLY ABOUT AND PARALLEL WITH THE DRIVESHAFT

Eero Matias Järvinen, Kakskerta, Finland, assignor of one-half to Hugo Solamo, Turku, Finland Application November 15, 1946, Serial No. 710,102
In Sweden July 20, 1946

7 Claims. (Cl. 123—43)

The internal combustion motor with cylinders arranged concentrically about and parallel with the driveshaft is a known type. In such motors the reciprocal motion of the pistons is transmitted to the driveshaft of the motor by means of a complicated system of levers which transform the straight-line movement of the pistons into a rotational one of this shaft. In another type of construction the connecting rods act upon an impeller disc fastened upon the shaft in a plane not at right angles to it. In this construction the ends of the connecting rods are so arranged as to contact the impeller disc approximately in the segment of that disc nearest the cylinder block at the beginning of the working stroke, the forward stroke of the piston (or connecting rod) thus resulting in rotation of the impeller disc until at the end of the working stroke the segment of the disc farthest from the cylinder block lies approximately opposite the cylinder in question.

In all previously known machines of this type the pistons have a reciprocal motion with respect to the driveshaft, and the masses thus forced to suddenly change their direction of motion are often of considerable size. This situation calls for precise balancing of the engine, which in turn again increases the size of the masses in motion and yet fails to make this engine run free of vibration. Furthermore such engines are always complicated a great deal by the necessity for a large number of bearings, levers, balances, etc.

The invention here disclosed intends an internal combustion motor of the type mentioned in which the difficulties above set forth are in large degree or entirely eliminated. Thus the engine runs almost entirely free of vibration, in the manner of a turbine, since it has no reciprocating masses, there are no levers or crankshaft in the usual sense, and the number of bearings is reduced to a minimum.

A motor built according to this patent is characterized chiefly by a driveshaft composed of two or more parts connected with universal joints and standing axially at an angle to one another, at least one part of the shaft being suitably mounted in bearings in a stationary engine block and bearing at its end next the universal joint a cylinder block attached to the shaft and rotating with the same, the cylinder head being formed by the end surface of the engine block lying close up to the cylinder block and at right angles to the portion of the driveshaft in question, while another portion of the driveshaft, connected with the first by a universal joint and consisting of two parts free to move slightly axially in relation to one another bears an auxiliary disc or the like securely fastened to it and standing at right angles to this last mentioned portion of the driveshaft, the ends of the connecting rods projecting from the cylinders bearing on the peripheral region of this disc and substantially at right angles to its plane, i. e. concentrically with and parallel to the corresponding portion of the shaft, the other end of this last mentioned portion of the shaft being either mounted in a suitable thrust bearing in the body of the engine or being coupled by a further universal joint to still another shaft portion bearing another cylinder block and mounted in bearings in a second engine block like and firmly connected to the first, the end surface of the engine block or blocks forming the cylinder head being supplied at the spot where it lies nearest the supporting disc on the rotation orbit of the cylinders, i. e. where the pistons passing in rotation come nearest the cylinder head, with a combustion channel serving as fuel injection and combustion chamber, of such peripheral extent that it connects two adjacent cylinders with one another when they pass it, the cylinder head being also equipped at a spot diametrically opposite channel, i. e. where the pistons passing in rotation are at their greatest distance from the cylinder head, with an exhaust port and radially adjacent fresh air intake port, the motor being further equipped with arrangements for adjusting the interval between the cylinder head and the cylinder block and with arrangements for equalizing pressure differences between cylinders in different cylinder blocks and the continuous supply of fuel to the same, as well as with a water cooling system, an oil lubricating system, and possibly an ignition system.

An advantageous form of execution of this invention comprises substantially a stationary engine block of cylindrical form consisting of two main parts lying at a fixed axial interval from one another and integrally connected with one another, in which and passing through the center of which a shaft section is mounted in bearings, the main portions of the engine block mentioned being so positioned with relation to one another that their shaft axes form a fixed obtuse angle, the drive shaft of the motor thus consisting of three sections connected with one another by universal joints, the two outer ends of the shaft being mounted in thrust and journal bearings in their respective main portions of the engine block, the end surfaces of which facing each other are plane surfaces standing at right angles to the shaft sections respectively mounted in them, which surfaces form the cylinder heads for the cylinders of the motor, which latter are placed in the cylinder block rotating about the outer sections of the (drive) shaft, the middle section of the shaft, connected by means of universal joints to the two outer sections, forming a like angle with each of these sections and bearing in its middle the auxiliary disc standing at right angles to this shaft section and mounted on both sides near its periphery with bearings for the ends of the connecting rods extending from the cylinders, in such manner that always two opposed connecting rods lie in one and the same axial line substantially at right angles to the plane of the auxiliary disc, the other ends of the connecting rods being flexibly joined to the pistons in the cylinders.

This form of execution of the motor last set forth will in the following be described with reference to the drawing appended further characteristics being given. Fig. I shows a partly sectional view of the motor, the one main portion of the motor being visible and the other only so much as is necessary for an understanding of how the motor works. This portion of the motor shown only in part is, for the rest, the mirror image of the part shown in its entirety. Fig. II is a partial section at the interstice between the rotating cylinder block and the fixed cylinder head showing the end surface of the cylinder head in one of the fixed main portions of the motor.

The motor consists of two fixed and substantially cylindrical blocks 1 and 2, which are immovably connected with one another, for example by means of connecting yokes (not shown) anchored about the circumference of the blocks. The whole unit is mounted on a firm base. The driveshaft of the motor consists of three sections, a middle section 3 and two outer sections 4 and 5. The sections of the shaft are connected with one another by means of the universal joints 6 and 7. The shaft sections 4 and 5 are centrally mounted in bearings in the cylindrical blocks 1 and 2, which blocks are so positioned with relation to one another that the shaft sections 4 and 5 stand at a fixed obtuse angle, the size of which depends on the length of stroke desired. The central section of the shaft 3 forms equal angles with the two outer sections 4 and 5. Each of the two outer shaft sections 4 and 5 is mounted in two journal bearings 8 and 9 in its respective stationary block 1 and 2. Adjacent to the respective outer load bearings 8 there is also a thrust bearing 10 to take up any axial pressure that may possibly arise. The end surfaces of blocks 1 and 2 facing each other are shaped as plane, annular surfaces standing at right angles to the respective shaft sections 4 and 5 and forming the plane of contact, respectively 11 and 12, with the engine block of the cylinder head. The cylinders, respectively 13 and 14, are contained in annular cylinder blocks, respectively 15 and 16, which are centered on and fastened to the ends of the respective shaft sections 4 and 5 nearest the inner journal bearing 9, thus rotating with the driveshaft. In the example shown each cylinder block has twelve cylinders. The end of the cylinder block facing the stationary engine block is precisely machined to contact and slide on the cylinder head 11 and 12. In the cylinders are pistons 17 and 18.

On the central section of the shaft 3 is fastened an auxiliary disc 19 or the like for the connecting rods, positioned symmetrically to the main parts of the motor. The ends, respectively 20 and 21, of the connecting rods emerging from the cylinders are mounted in bearings on the two sides of this auxiliary disc near its periphery, suitably with ball joints, in such a manner that they continuously maintain substantially a right angle to the plane of the disc. The other ends of the connecting rods are attached in corresponding fashion to the pistons. The connecting rods 20 and 21 anchored on opposite sides of the disc 19 are opposed to each other in pairs. Thus the auxiliary disc 19, all the connecting rods 20, 21, all the pistons 17, 18, and the central section of the shaft 3 form together a unit rotating about its mathematical axis, the parts of which unit are practically immobile with relation to one another. The cylinder blocks 15 and 16 also form a part of this rotating unit. By reason of the angle between the different parts of the shaft, however, any point on the cylinder blocks will during rotation occupy extreme positions relative to the corresponding point on the other cylinder block and to the unit fastened directly to the central shaft section 3, seemingly oscillating between these extremes. However no real axial displacement in relation to shaft section 3 occurs. For the same reason the pistons 17, 18 will also occupy extreme positions relative to the cylinder heads 11 and 12.

In those segments of the cylinder heads 11, 12 situated nearest each other on the path of the cylinders there is in each cylinder head a peripheral combustion channel, respectively 22 and 23. The peripheral extent of each of these channels is so great that two adjacent cylinders are always placed in connection with one another through the channel on passing the same. A pressure tube 24 leads to each channel, each tube being equipped with a sparkplug 25 adjustable for depth of entrance into the tube. A fuel injection port 26 also projects into combustion channel 22. The same arrangements are to be found in the cylinder head 2. Diametrically opposite to the channels 22 and 23 the cylinder heads are equipped with an exhaust port, respectively 27 and 28, and with an air intake port, respectively 29 and 30. These ports connect respectively to the exhaust 31 and intake 32 manifolds. The peripheral extent of the exhaust ports 27, 28 is suitably somewhat greater than that of the intake ports 29, 30, the length of which latter can approximately correspond to the diameter of a cylinder.

The cylinder block and the portions of the stationary engine blocks 1, 2 serving as cylinder heads are cooled in known fashion with water. To arrange for flow of the cooling water from the stationary cylinder head to the rotating cylinder block a recess 33 has been left in the center of the cylinder head and divided by means of the cylindrical partition 34 into two closed, annular chambers surrounding the end of shaft section 4. The cooling water is led into the inner annular chamber through pipe 35 and thence through conduits 36 into the water jacket of the cylinder block, whence it goes through the conduits 37 to the outer annular chamber and off through pipe 38. The cooling fluid is circulated in known fashion by means of a suitable pump.

The motor is also lubricated in known fashion by means of pressure lubricating system. For the sake of clarity no lubrication system has been included in the drawing.

Only two sparkplugs are required for ignition, insofar as such are necessary at all. As already mentioned, the sparkplugs are mounted in pressure tubes (for example 24) opening each into its respective combustion channel 22, 23. They may also be mounted in channels contrived especially for this purpose. Since continuous combustion is maintained in the combustion channel while the motor runs the sparkplugs are necessary only when starting if fuel with a high flash point is used. Since no material for the sparkplug would stand the heat of the continuous combustion for long the sparkplug is so constructed that it can after ignition for starting be withdrawn into and through the pressure tube 24, which is thereby partly or wholly exposed. Insofar as fuel with a low flashpoint or, failing that, a high compression is used no ignition system at all is necessary, the heat generated by compression sufficing to ignite the fuel. It is also possible to first start the motor with such a low flashpoint fuel and then shift during operation to a fuel with a higher flashpoint. The sparkplug 25 is connected through cable 39 to the high voltage apparatus.

The fuel is conducted from a fuel pump through a pipe 40 to a fuel feed regulator 41 and on through a pipe 42 to the injection nozzle 26.

To avoid axial strains on the motor it is important that the working pressure in the two combustion channels 22 and 23 is the same. Therefore the pressure tubes opening on each of these channels, one of which tubes 24 is shown, are connected with one another through a pipe 43. This pipe is subdivided into two parts by the pressure chamber 44, inside which is located the spade-shaped end of a two-ended lever pivoted on axle 45. The other end of the lever is flexibly fastened to a guide-rod 46. At equal pressure, or equal fuel feed, in the two combustion channels 22, 23 this mechanism is held by a spring in its normal position, in which the direct connection between the two combustion channels is interrupted by the spade-shaped member in pressure chamber 44. The throttle-rod 46 is joined at each end to a lever 47 which operates on the fuel feed regulator 41. This is preferably so constructed that a small deflection of lever 47 has no influence on the fuel feed to nozzle 26, but as the deflection increases the fuel supply is throttled and finally shut off entirely in extreme cases.

The pressure generated in the cylinders tends, of course, to force the cylinder head away from the cylinder block. This would widen the interval between these bearing surfaces, which might lead to gas leakage and a consequent loss of pressure. In order to keep this interval at such a width as to prevent gas leakage and yet permit the cylinder block to rotate without freezing fast on the bearing surfaces 11 and 12 respectively on the stationary engine block a special adjustment fixture is provided.

In the further portion of the engine block, next to the journal and thrust bearings 8 and 10 a chamber 48 has been provided. This contains a thrust disc 49, which is axially moveable and bears on the thrust bearing 10 but does not partake in the rotation of shaft 4. The chamber 48 further contains a washershaped pressure diaphragm box 50, which fills the space between the thrust disc 49 and the wall of chamber 48 nearest the cylinder head.

From the upper part of the diaphragm box 50 issues a pipe 51, which has an enlarged portion 52. The diaphragm box 50 is filled with a pressure transmitting medium, for instance oil, so that the level of the oil reaches the enlarged portion 52 and partly fills the same with oil, as indicated by the dotted line. The lower portion 53 of the enlarged pipe section 52 is fitted with a check valve which allows the oil to flow freely into the diaphragm box 50 but only slowly out of it, thus preventing sudden variations of pressure in diaphragm box 50. The pipe 51 leads on to a pressure regulator 54.

The engine blocks 11 and 12 are provided on their end, bearing surfaces with circular grooves, respectively 55, 56 and 57, 58. These grooves lie concentrically both inside and outside the rotational path of the cylinders and may be two or more in number. The drawing shows two grooves in each cylinder head, and the position of the flight of cylinders in the cylinder block relative to the cylinder head is indicated in dotted lines in Fig. 2. These grooves are through pipe 59 connected with the pressure regulator 54, which latter also has a manually operated adjusting valve 60.

In order to allow of the necessary, though slight, displacement of the cylinder blocks, partly in relation to the cylinder head but partly also in relation to each other the central shaft section 3 is constructed of two telescoping parts movable in respect to each other, as may be seen from the drawing.

The operation of the motor is as follows:

The motor is started by means of an auxiliary motor acting on the driveshaft. The cylinder receiving air at the air intake 29 or 30 moves around the periphery toward the combustion channel 22 or 23 respectively, in which process the air is compressed. The continuously functional fuel pump feeds in fuel to the combustion channels. When the cylinder lies opposite the combustion channel at the end of the compression phase and the piston is nearest the cylinder head ignition takes place either through the agency of the sparkplug 25 or through the heat generated by compression. Ignition takes place simultaneously in two opposite cylinders, one in each cylinder block. Part of the explosion pressure in these two cylinders is taken up by the connecting rods, which bear in disposition to one another on the auxiliary disc 19, but one force component is given a peripheral direction by the angle between the two main parts of the motor, which causes the motor to begin to turn. At the end of the working phase the cylinder reaches the exhaust port 27 or 28, and the gases go out through the manifold. Immediately thereafter, however, the cylinder takes in fresh air again through the intake port, as above described. Fresh air may possibly be introduced under pressure, for example by means of a compressor. The process above described takes place in each of the cylinders in turn. Before one cylinder just beginning its working phase has entirely passed the connecting combustion channel the next cylinder, filled with compressed air, already reaches this channel, when the ignited fuel-air mixture in the combustion channel mixes with the fresh air in the latter cylinder and this cylinder also enters upon its working phase. Ignition in the combustion channel is therefore continuous.

If the pressure is not the same in opposed cylinders in the two main parts of the motor the thrust bearings, for example 10, are put under pressure and injurious stresses arise, since the axial force components of the explosions do not neutralize each other in this case.

If, for instance, the pressure in the left (in the drawing) side of the motor is higher this pressure will propagate itself through the pressure tube 24 and pipe 43 to the pressure chamber 44, where it will impinge on the spade-shaped lever arm therein and cause this to be displaced to the right from its neutral position, which in turn opens the connection with the combustion channel 23 in the right side of the motor and allows the pressure to equalize. At the same time the guide-rod 46 is displaced to the left against its spring, operating the lever 47 of the fuel feed regulator 41. This latter may preferably be so adjusted that the fuel feed is not affected by small pressure differences which can be equalized directly through the pipe 43.

If the difference in pressure is very large the guide-rod is displaced so far that the fuel feed regulator 41 throttles the supply of fuel more and more, which necessarily reduces the excess pressure. In the extreme case that one half of the motor does not function at all the fuel supply is shut off entirely by this arrangement and the motor stops.

It may occur when the motor runs that abnormally large quantities of combustion gases leak out through the interstice between the rotating cylinder block and the bearing surface of the cylinder head in the stationary part of the motor because the interval between them has become too large. In such a case these leakage gases are trapped primarily in the concentrical grooves 55, 56 and 57, 58 in the cylinder heads 11 and 12. The pressure in the grooves rises and propagates itself through the pipeline 59 to the pressure regulator 54 and on to the enlarged portion 52 of pipe 51 which connects the pressure regulator 54 with the pressure membrane box 50, which latter is thereby expanded and consequently displaces the thrust disc 49 to the left (in the drawing). This bears via the thrust bearing 10 on the shaft section 4 and displaces this also to the left, causing the interval between the cylinder block and cylinder head to close and the gas leakage to decrease. The excess pressure in the grooves 55, 56 is equalized by the adjustable valve 60, through which the gas can escape, in consequence of which the oil from the pressure membrane box 50 flows slowly back again through the valve in part 53 to the enlarged portion 52 of pipe 51 until the normal interval is again attained. The normal leakage pressure in the grooves 55, 56 may thus be predetermined by means of valve 60, and thus also the normal bearing play between the cylinder body and head. The valve 53 for retarding the oil flow is important, since if it did not exist variations in the gas pressure in the pressure regulator 54 would be all too quickly followed by oil pressure variations in the pressure membrane box 50. This would cause rapid axial oscillations of shaft section 4 and the parts connected with it, which would naturally be injurious.

The internal combustion motor as set forth in this invention functions, then, as a two cycle motor and operates, as one may conclude from the above, remarkably evenly and free from vibration. The motor may be caused to run in either direction as desired without alterations. The space required for the motor is considerably less in relation to the cylinder volume than that of other internal combustion motors. This makes it particularly suitable, for instance, as a motor for vehicles. It goes without saying that several motor units of the kind described may be coupled in series at need. The regulator arrangements and the like described in connection with the motor must, of course, be considered as one example of how these principles may be put into practice, which does not exclude the possibility of using other arrangements with like function to ensure the operation of the motor according to the terms of the invention.

What I claim is:

1. In an internal combustion engine having opposed banks of cylinders with pistons acting upon a common driving disc set at equal acute angles with respect to each said bank of cylinders, a separate cylinder head for each of said banks of cylinders, a combustion channel formed in each of said cylinder heads and a pressure equalization tube connecting said combustion channels to equalize any pressure differences in said channels.

2. In an internal combustion engine having opposed banks of cylinders with pistons acting upon a common driving disc set at acute angles with respect to each said bank of cylinders, a separate cylinder head for each of said banks of cylinders, a combustion channel formed in each of said cylinder heads, a pressure equalization tube connecting said combustion channels to equalize any pressure differences in said channels, said pressure equalization tube including a pressure chamber, a pressure equalization device mounted for operation within said pressure chamber, a throttle connected with each of said combustion channels, a throttle control rod connecting the throttles for each of said combustion channels, and means for operatively connecting said pressure equalization device with said throttle control rod to equalize the pressure.

3. In an internal combustion engine a cylinder head, a cylinder block, means for mounting said cylinder head and cylinder block for relative rotary movement one over the other during operation of the engine, means to urge said head and block together to prevent leakage of gases between the two and means responsive to increase in leakage pressure to increase the force urging said head and block together.

4. Structure as defined in claim 3 wherein said responsive means is a diaphragm device operable on the means for mounting said cylinder head and cylinder block for relative rotary movement.

5. Structure as defined in claim 4 wherein leakage gas receiving grooves are formed in the face of one of said head and block where they rotate one over the other, and connecting means are provided between said grooves and said diaphragm device.

6. Structure as defined in claim 5 wherein said connecting means is a pipe with an enlargement therein for reception of the pressure transmission medium from the diaphragm device, said pipe also including a check valve therein for retarding flow of said pressure transmission medium in one direction.

7. In an internal combustion engine an elongated housing, a shaft mounted within said housing, an annular chamber formed in said housing and surrounding said shaft, a member in said chamber for exerting an endwise thrust on said shaft, a diaphragm device in said chamber formed for actuation upon said member, a pressure medium conducting conduit extending through the wall of said diaphragm device, a cylinder head at one end of said housing, a cylinder block mounted on said shaft in opposed rotary relation with respect to said cylinder head, said head and block having opposed surfaces which slide upon one another during the relative rotation of said head and block, formed in the said surface on said head being recessed in the form of an annular channel to receive gases tending to leak out between said surfaces and a conduit extending from said channel and joined with the said pressure medium conducting conduit, whereby any increase in the pressure of gases tending to leak out between said head and said block will be transmitted to said diaphragm device, which will in turn affect said thrust member to cause endwise movement of said shaft and consequent drawing of said block against said head.

EERO MATIAS JÄRVINEN.

REFERENCES CITED

The following references are of record in the file of this patent:

UNITED STATES PATENTS

| Number | Name | Date |
|---|---|---|
| 848,665 | Lombard | Apr. 2, 1907 |
| 892,804 | Burbank | July 7, 1908 |
| 933,316 | Macomber | Sept. 7, 1909 |
| 972,869 | Jones | Oct. 18, 1910 |
| 980,491 | Coleman | Jan. 3, 1911 |
| 1,019,521 | Pratt | Mar. 5, 1912 |
| 1,307,045 | Galbreath | June 17, 1919 |
| 1,696,676 | Fuhr | Dec. 25, 1923 |
| 2,350,056 | Mallory | May 30, 1944 |
| 2,387,908 | Howard | Oct. 30, 1945 |